US007251815B2

(12) United States Patent  
Donovan et al.

(10) Patent No.: US 7,251,815 B2  
(45) Date of Patent: Jul. 31, 2007

(54) MULTIPLE VIRTUAL MACHINES SHARING PROCESSOR AND WORK QUEUE IN MEMORY HAVING PROGRAM/DISPATCH FUNCTIONS FOR ASSIGNING AND ACCESSING WORK ITEMS WHILE THE VIRTUAL MACHINE WAS NOT IDLE

(75) Inventors: Michael J. Donovan, Endicott, NY (US); Melissa K. Howland, Endicott, NY (US); Steven Shultz, Endicott, NY (US); Xenia Tkatschow, Jamesville, NY (US)

(73) Assignee: International Business Machines Corporation, Armonk, NY (US)

( * ) Notice: Subject to any disclaimer, the term of this patent is extended or adjusted under 35 U.S.C. 154(b) by 874 days.

(21) Appl. No.: 10/425,469

(22) Filed: Apr. 29, 2003

(65) Prior Publication Data

US 2004/0221285 A1 Nov. 4, 2004

(51) Int. Cl.
*G06F 9/46* (2006.01)
*G06F 9/455* (2006.01)
*G06F 3/00* (2006.01)
*G06F 9/44* (2006.01)
*G06F 13/00* (2006.01)

(52) U.S. Cl. .......................... 718/105; 718/1; 718/102; 719/312

(58) Field of Classification Search ................ 719/319, 719/312; 718/1, 100–108
See application file for complete search history.

(56) References Cited

U.S. PATENT DOCUMENTS 4,682,284 A * 7/1987 Schrofer ...................... 710/55

(Continued)

FOREIGN PATENT DOCUMENTS

JP  2112055 A  4/1990

(Continued)

OTHER PUBLICATIONS

IBM TDB vol. 37 No. 06A Jun. 1994 "Shared Memory Cluster—A Scalable Multiprocessor Design" pp. 503-507 IBM TDB vol. 35 No. 18 Jun. 1992 "Logically Shared Memory" pp. 44-49.

(Continued)

*Primary Examiner*—Meng-Al T. An  
*Assistant Examiner*—Eric C Wai  
(74) *Attorney, Agent, or Firm*—Arthur J. Samodovitz

(57) ABSTRACT

A system, computer program product and method for dispatching work items in a virtual machine operating system. The virtual machine operating system defines first and second virtual machines. First and second work queues are created in a memory. The first virtual machine assigns a first work item to the first work queue and a second work item to the second work queue. The first virtual machine schedules work items from the first work queue for execution by the first virtual machine. The first and second work items originate from the first virtual machine. The first and second work queues are directly accessible by the first virtual machine. The second virtual machine assigns a third work item to the first work queue and a fourth work item to the second work queue. The second virtual machine schedules work items from the second work queue for execution by the second virtual machine. The third and fourth work items originate from the second virtual machine. The first and second work queues are directly accessible by the second virtual machine. The first virtual machine is not able to schedule work items from the second work queue, and the second virtual machine is not able to schedule work items from the first work queue. A shared work queue in shared memory is also disclosed.

18 Claims, 8 Drawing Sheets

U.S. PATENT DOCUMENTS

| | | | |
|---|---|---|---|
| 5,592,625 A | 1/1997 | Sandberg | 395/200.08 |
| 5,692,192 A | 11/1997 | Sudo | 395/675 |
| 5,884,077 A | 3/1999 | Suzuki | 395/675 |
| 6,003,066 A | 12/1999 | Ryan et al. | 709/201 |
| 6,081,833 A | 6/2000 | Okamoto | 709/213 |
| 6,148,378 A | 11/2000 | Bordaz | 711/147 |
| 6,170,045 B1 | 1/2001 | Bobak et al. | 711/169 |
| 6,205,528 B1 | 3/2001 | Kingsbury | 711/170 |
| 6,272,516 B1* | 8/2001 | Angle et al. | 718/102 |
| 6,389,482 B1 | 5/2002 | Bobak et al. | 709/312 |
| 6,438,663 B1 | 8/2002 | Agarwal et al. | 711/148 |
| 6,477,560 B1 | 11/2002 | Murayama et al. | 709/104 |
| 6,938,253 B2* | 8/2005 | Kim | 718/102 |
| 2003/0037178 A1* | 2/2003 | Vessey et al. | 709/319 |

FOREIGN PATENT DOCUMENTS

| | | |
|---|---|---|
| JP | PUPA 05-233562 | 9/1993 |
| JP | 09-319653 | 12/1997 |
| JP | PUPA 2000-215071 | 8/2000 |
| WO | WO 00/73902 A1 | 7/2000 |

OTHER PUBLICATIONS

U.S. Appl. No. 10/280,987 entitled "System and Method for Transferring Data Between Virtual Machines or Other Computer Entities" filed on Oct. 24, 2002 by Shultz and Tkatschow.

US Patent Application END9-2003-0011 entitled"Management of Virtual Machines to Utilize Shared Resources" by: C. Casey, S. Shultz & X. Tkatschow.

US Patent Application END9-2003-0019US1 entitled "Management of Locks in a Virtual Machine Environment" by: M. J. Donovan, M.K. Howland, S.S. Shultz & X. Tkatschow.

zVM™ Built on IBM Virtualization Technology, General Information Version 4 Release 2.0.; www.vm.ibm.com/pubs/pdf/HCSF8A60.PDF.

\* cited by examiner

MULTIPLE VIRTUAL MACHINES SHARING PROCESSOR AND WORK QUEUE IN MEMORY HAVING PROGRAM/DISPATCH FUNCTIONS FOR ASSIGNING AND ACCESSING WORK ITEMS WHILE THE VIRTUAL MACHINE WAS NOT IDLE

FIELD OF THE INVENTION

The invention relates generally to computer systems, and deals more particularly with dispatch functions in virtual machine operating systems.

BACKGROUND OF THE INVENTION

A virtual machine operating system is well known today, and includes a common base portion and separate user portions formed by the common base portion. In an IBM z/VM operating system, the common base portion is called the "Control Program" or "CP" and each user portion is called a "virtual machine" or "guest". A virtual machine or guest is a virtual sharing/partitioning of real resources such as real memory, CPU and I/O. A guest operating system executes/runs on each virtual machine, and one or more applications run on the guest operating system. Each application and guest operating system behave as if they are running on their own private, real computer.

Each virtual machine has its own dispatch function which consists of its synchronization function, work queue assignment function, work scheduler and associated work queue of work items or tasks assigned by and to the virtual machine. The synchronization function, work queue assignment function, work scheduler and the work queue are all private to the virtual machine. A synchronization function manages locks to control which tasks must run sequentially and which tasks can run in parallel. A work queue assignment function is a program function within the virtual machine which adds work items to the work queue of the virtual machine when generated by the virtual machine. Each work item on the queue includes information indicating its type, and therefore, which function within the virtual machine is best suited to handle it. A "work scheduler" is a program function which schedules each of the work items on its queue for execution, and passes them to the appropriate function within the virtual machine for execution. There are many known algorithms for scheduling work items. They may be based on a variety of factors such as a priority level assigned to each task, the order in which the work items arrived on the queue, etc. Some of those work items originate from the guest operating system and others originated from the application(s) running on the guest operating system.

It is wasteful of the virtual machine and the associated partition of real computer resources for the virtual machine to be idle. This may occur when there are no work items on the associated work queue, and the current work item is completed. While the foregoing dispatch function is effective in assigning and dispatching tasks, it would be desirable to manage the dispatch functions of multiple virtual machines so as to optimally balance loads and skills between different virtual machines.

It was also known that a server virtual machine can be utilized for the purpose of "hosting" a shared work queue for the other, "working" virtual machines. The shared work queue resides in memory private to the server virtual machine. When a working virtual machine creates a new work item, and the work queue assignment function for this working virtual machine decides to send this new work item to the server virtual machine, it uses a communication protocol (e.g. TCP/IP) to send that work item to this server virtual machine. Then, the server virtual machine places the new work item on the shared work queue in an order determined by the server virtual machine. When a work scheduler within a working virtual machine wants to execute a work item on the shared work queue, it uses a communication protocol to make that request to the server virtual machine. In response, the server virtual machine uses a communication protocol to send a work item to the working virtual machine that made the request. While this arrangement provides a shared work queue, it requires a high overhead communication protocol to both send a work item to the work queue and obtain a work item from the work queue. In addition this arrangement requires an extra virtual machine to manage the shared work queue. Furthermore, the server virtual machine attempts to balance the load among the working virtual machines by monitoring the working virtual machines and estimating which working virtual machine will be able to handle the work item most expeditiously. The server virtual machine must also be able to re-balance the load among working virtual machines when working virtual machines are dynamically added and/or deleted. Still further, the server virtual machine must synchronize the work items as determined by its private synchronization function. All these server virtual machine functions require considerable communication between the server virtual machine and the working virtual machines.

Accordingly, an object of the present invention is to provide functionality in a virtual machine operating system which effectively balances work loads and/or skills between different virtual machines.

Another object of the present invention is to provide functionality in a virtual machine operating system of the foregoing type which minimizes overhead required to manage the dispatch and other functions.

SUMMARY OF THE INVENTION

The invention resides in a system, computer program product and method for dispatching work items in a virtual machine operating system. The virtual machine operating system defines first and second virtual machines. First and second work queues are created in a memory. The first virtual machine assigns a first work item to the first work queue and a second work item to the second work queue. The first virtual machine schedules work items from the first work queue for execution by the first virtual machine. The first and second work items originate from the first virtual machine. The first and second work queues are directly accessible by the first virtual machine. The second virtual machine assigns a third work item to the first work queue and a fourth work item to the second work queue. The second virtual machine schedules work items from the second work queue for execution by the second virtual machine. The third and fourth work items originate from the second virtual machine. The first and second work queues are directly accessible by the second virtual machine.

According to one feature of the present invention, the first virtual machine is not able to schedule work items from the second work queue, and the second virtual machine is not able to schedule work items from the first work queue.

The invention also resides in a virtual machine operating system defining first and second virtual machines. The virtual machine operating system comprising a shared work queue in a memory. The first virtual machine includes a first program function to assign a first work item to the shared work queue. The first virtual machine includes a second program function to schedule work items, originating from the first and second virtual machines, from the shared work queue for execution by the first virtual machine. The first work item originating from the first virtual machine. The shared work queue is directly accessible by the first and second program functions. The second virtual machine includes a third program function to assign a third work item to the work queue. The second virtual machine includes a fourth program function to schedule work items, originating from the first and second virtual machines, from the shared work queue for execution by the second virtual machine. The second work item originates from the second virtual machine. The shared work queue is directly accessible by the third and fourth program functions. The memory is shared by the first and second virtual machines.

DETAILED DESCRIPTION OF THE PREFERRED EMBODIMENTS

Figure 1:
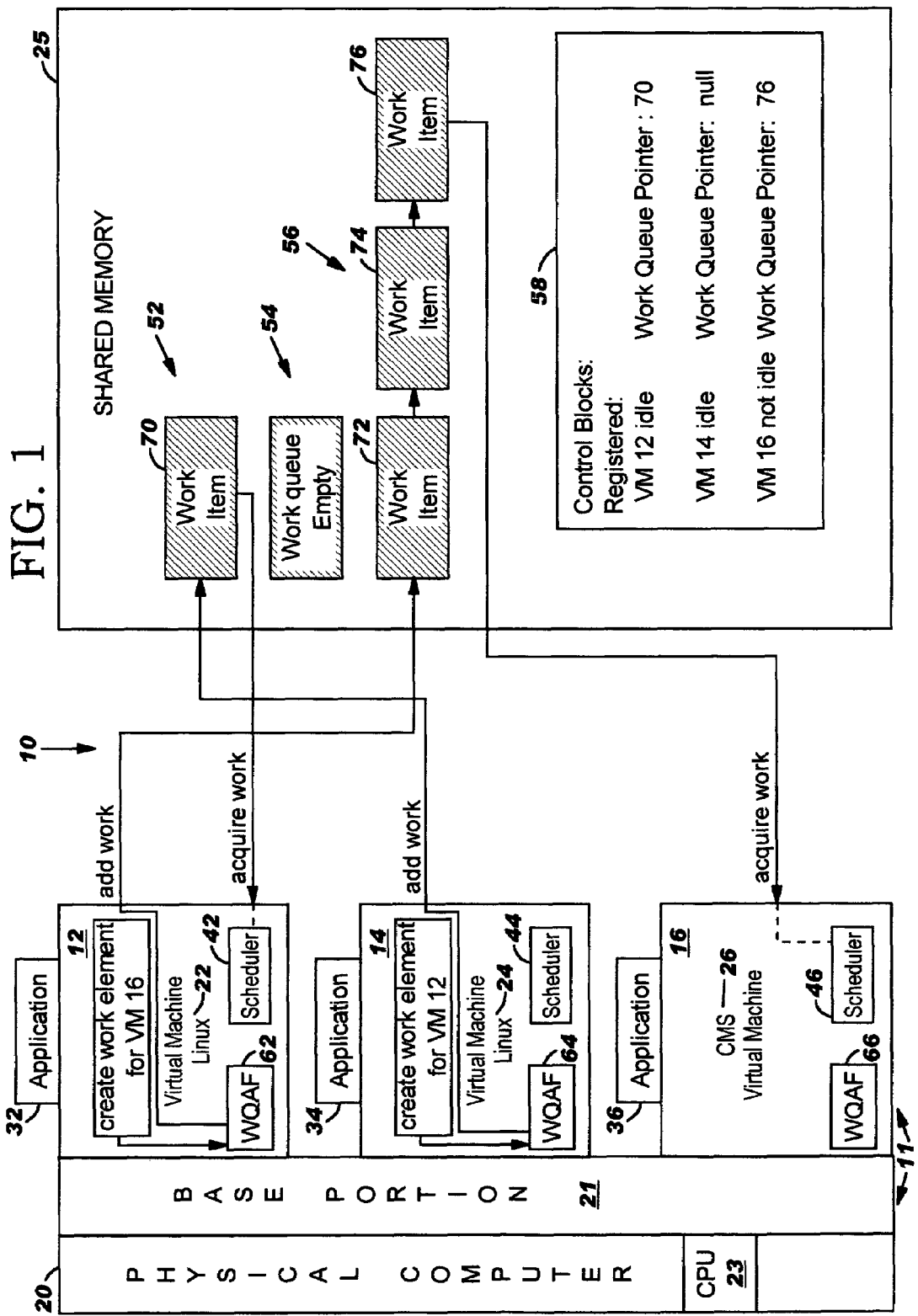
FIG. 1 is a block diagram of a computer system with multiple virtual machines according to the present invention.

Referring now to the drawings in detail wherein like reference numbers indicate like elements throughout, FIG. 1 illustrates a computer system generally designated 10. Computer system 10 includes a physical computer 20 (which includes a CPU 23) and a virtual machine operating system 11. By way of example, the virtual machine operating system can be IBM z/VM version 4.2.0 or 4.3.0 modified to include the present invention. The details of z/VM 4.2.0 are disclosed in IBM publication "z/VM 4.2.0 General Information" (Document Number: GC24-5991-03) which is available from International Business Machines Corp. at PO Box 29570, IBM Publications, Raleigh, N.C. 27626-0570 or on the WWW at the homepage of IBM with application suffix "/shop/publications/order". This publication is hereby incorporated by reference as part of the present disclosure. Operating system 11 executes in the physical computer 10 such as an IBM zSeries mainframe although the present invention can be implemented in other server computers or personal computers as well. Operating system 11 includes a common base portion 21 (called "CP" in the z/VM operating system). Common base portion 21 logically partitions the resources (including the CPU and memory) of the physical computer to form user portions 12, 14 and 16 (called "virtual machines" or "guests virtual machines" in the z/VM operating system). The common base portion also performs functions such as virtualizing memory, virtualizing devices and virtualizing CPUs. Guest operating systems 22, 24 and 26 execute on user portions 12, 14 and 16, respectively, and applications 32, 34 and 36 execute on guest operating systems 22, 24 and 26 respectively. There may be multiple applications executing on each operating system. By way of example, guest operating systems 22 and 24 are the Linux (™ of Linus Torvalds) operating system and operating system 26 is an IBM CMS operating system. Other guest operating systems executing on user portions are also feasible such as Microsoft Windows (™) operating system, Unix (™) operating system, Sun Microsystems Solaris (™) operating system or Hewlett Packard HP UX operating system. By way of example, applications 32, 34 and 36 can be IBM DB2 data base management application, IBM WebSphere application, communications applications, etc. The nature of applications 32, 34 and 36 form no part of the present invention, except that they may generate work items.

Each virtual machine has its own private memory for its private data, applications and operating system functions such as Work Queue Assignment Functions 62, 64 and 66 ("WQAFs") and work schedulers 42, 44 and 46 in virtual machines 12, 14 and 16, respectively. Consequently, each virtual machine is afforded a measure of privacy from the other virtual partitions as in separate physical computers. The logical partition between virtual machines is also provided by the allocation of a virtual CPU and other virtual devices to each virtual machine. A "virtual CPU" is a portion of the real CPU(s) that appears to the guest operating system as its own CPU. As explained in more detail below, each WQAF assigns each work item created by its own virtual machine to any work queue 52, 54 or 56 in shared memory based on its assignment algorithm. The assignment algorithm may be based on work load balancing, which virtual machines are specially adapted to handle certain types of work items, etc. Each WQAF also monitors and updates a status of each virtual machine as "idle" or "not idle" as described below. Each scheduler schedules the execution of work items on its nominal work queue according to its scheduling algorithm. The scheduling algorithm may be based on a priority level assigned to the work item, the time the work item was assigned to the work queue, etc.

Computer 10 also includes a memory area 25 which is shared by all of the virtual machines 12, 14 and 16. Being "shared" each virtual machine can directly access the shared memory 25 and the, data and data structures stored in the shared memory by appropriate address. In accordance with the present invention, the work queues 52, 54 and 56 for the WQAFs 62, 64 and 66 and respective schedulers 42, 44 and 46 are located in shared memory (even though the WQAFs and schedulers are all in the private memory of the respective virtual machines). Consequently, each WQAF can access all the work queues to add a work item to any of the work queues. In the first embodiment of the present invention, each scheduler is programmed to only remove work items from its "semi-dedicated" work queue, i.e. work queue 52 for virtual machine 12 and scheduler 42, work queue 54 for virtual machine 14 and scheduler 44 and work queue 56 for virtual machine 16 and scheduler 46. Each of these work queues is "semi-dedicated" in the first embodiment of the present invention because only the scheduler in the respective virtual machine removes work items from it but any of the WQAFs can add work items to it. (However, in another embodiment of the present invention, each scheduler can be programmed to access the other semi-dedicated work queues to remove a work item when its semi-dedicated work queue is empty.) In the state illustrated in FIG. 1, work queue 52 has one work item 70 which was acquired from virtual machine 14 by action of WQAF 64, work queue 54 is empty, and work queue 56 has three work items 72, 74 and 76. Work item 72 was acquired from virtual machine 12 by action of WQAF 62. Although not shown, work items 74 and 76 were acquired from virtual machine 14 by action of WQAF 64. Also in the state illustrated in FIG. 1, virtual machine 12 is acquiring work item 70 from work queue 52 by action of scheduler 42, and virtual machine 16 is acquiring work item 76 from work queue 56 by action of scheduler 46. A control block 58 indicates the current state, "idle" or "non idle", of the virtual machines and which, if any, of the work items from each work queue is the next to be scheduled. In the state illustrated in FIG. 1, virtual machine 12 is idle with its work queue pointer in scheduler 42 pointing to work item 70. After virtual machine 12 acquires work item 70, its work queue pointer will be "null" because there will be no work items left in work queue 52 (unless one was added in the interim). Also in the state illustrated in FIG. 1, virtual machine 14 is idle with its work queue pointer in scheduler 44 indicating "null" because there are currently no work items in work queue 54. Also in the state illustrated in FIG. 1, virtual machine 16 is "not idle"; it is currently performing a work item previously acquired from one of the work queues. The work queue pointer of scheduler 66 within virtual machine 16 is currently indicating work item 76, so this work item has not yet been removed by scheduler 46 for execution by virtual machine 16.

Figure 2:
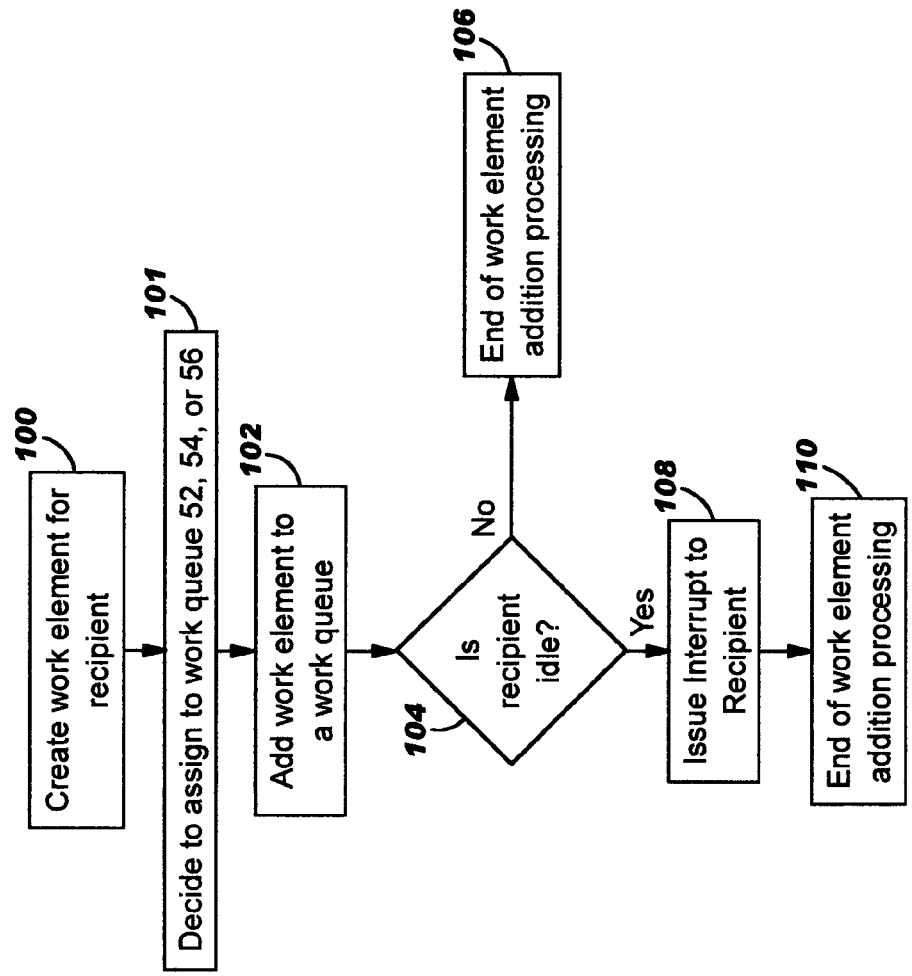
FIG. 2 is a flow chart illustrating a work queue assignment function and associated operation of virtual machines within the computer system of FIG. 1.

FIG. 2 illustrates each WQAF and associated operation of the virtual machine. The virtual machine creates a work item, such as to read or write data, execute an application, make a request to an application, etc. (step 100). The work item can be initiated by the guest operating system or by the application running on the guest operating system and passed to the guest operating system for handling. Next, the WQAF determines whether to assign the work item to one of the semi-dedicated work queues 52, 54 or 56 or to a shared work queue 80 described below. This decision is based on an assignment function within the WQAF; a decision to assign a work item to the shared work queue is typically made for load balancing. Assume that the WQAF decides to assign this work item to one of the semi-dedicated work queues 52, 54 and 56 (decision 101). Next, the WQAF within the virtual machine (for example, WQAF within virtual machine 12) that created the work item assigns the work item to a work queue determined by the assignment algorithm within the WQAF (step 102). The WQAF also determines which position in the work queue to insert the new work item. If the assignment algorithm is simply first in first out, then the WQAF assigns each new work item to the end of the work queue, so it is last to be removed. If the assignment algorithm is based on priority level, then the WQAF assigns each new work item to a position within the work queue before other work items of lower priority and after work items of the same priority (to prevent work items from becoming stale) or higher priority. In example illustrated in FIG. 1, WQAF 62 assigns the work item to work queue 56 for virtual machine 16. This particular assignment was not based on load balancing because virtual machine 14 is currently idle and its work queue 54 is currently empty, whereas virtual machine 16 is currently not idle and its work queue 56 has two other work items before the addition of work item 72. Instead, this particular assignment was based on the special ability of virtual machine 16 to handle this type of work item, an ability not found in virtual machines 12 or 14. WQAF 62 also reads the control block 58 to determine if virtual machine 16 is currently idle (decision 104). If not, i.e. virtual machine 16 is currently busy, then WQAF 62 does not interrupt virtual machine 16 and ends its processing for this work item (step 106). Referring again to decision 104, if virtual machine 16 is currently idle, then WQAF 62 issues an interrupt to virtual machine 16 (step 108) and ends is processing of this work item (step 110). The interrupt will alert virtual machine 16 to invoke the scheduler 46 to check work queue 56 (or the shared work queue 80) for a work item.

Figure 3:
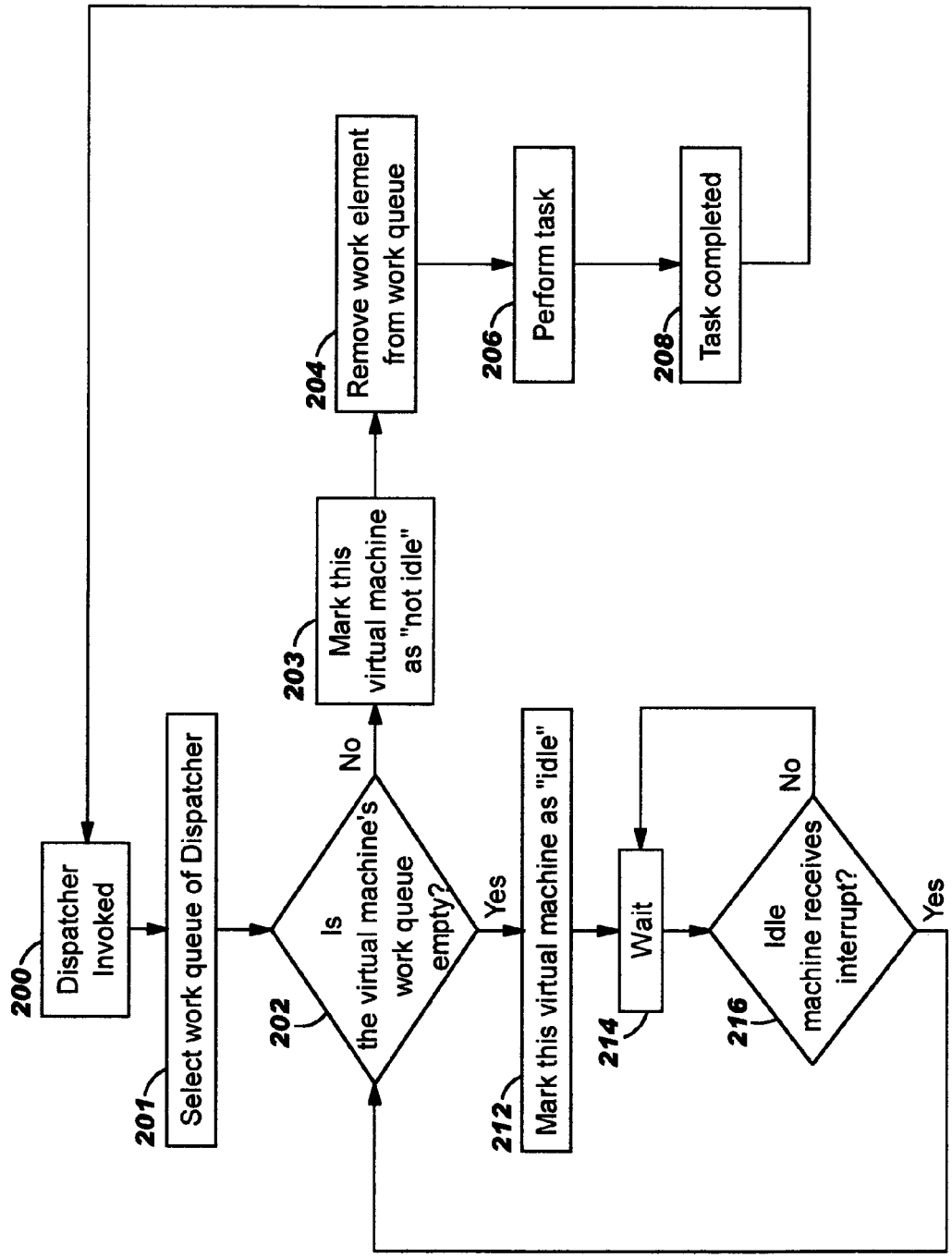
FIG. 3 is a flow chart illustrating a work dispatch function and associated operation of the virtual machines within the computer system of FIG. 1.

FIG. 3 illustrates the work scheduler of each virtual machine and the associated operation of the virtual machine. In step 200, the scheduler of the virtual machine (for example, scheduler 42 of virtual machine 12) is invoked. The invocation is initiated by the virtual processor within the virtual machine after a current work is completed or after receipt of an interrupt when the virtual machine is in the quiescent state. The scheduler first decides whether to fetch a work item from its semi-dedicated work queue or the shared work queue 80, described below. For purposes of illustration, assume the scheduler decides to fetch a work item from its semi-dedicated work queue (step 201). Next, the scheduler 42 checks the control block 58 to determine if there is a work item or a group of work items on the work queue 52 for the virtual machine 12 (decision 202). If there is a group of work items on the work queue, then a pointer in the control block indicates which is the next work item to be scheduled. The determination of which work item in the work queue to be scheduled next is determined by the order they appear on the work queue. The WQAF of the virtual machine that created the work item determines where in the work queue to position the work item. The WQAF also determined on which work queue to place the work item. If the work queue is not empty (which is the case illustrated in FIG. 1 for work queue 52), the virtual machine is marked "not idle" (step 203) and scheduler 42 removes the work item from the queue indicated by the pointer in the control block (step 204). In the example illustrated in FIG. 1, the pointer points to work item 70. Then, the scheduler 42 parses the work item to determine its nature and what function to call within virtual machine 12 to perform the work item. After removal of work item 70, the work queue 52 will be empty (unless a new work item was very recently added), so the pointer for work queue 52 will indicate "null". Then, the recipient function performs the work item (step 206). After the work item is completed (step 208), control is returned to the scheduler to repeat steps 200, 201 and 202.

Referring again to decision 202, if there is no work item on the scheduler's queue such as after work item 70 was completed (or the case of work queue 54 in the state illustrated in FIG. 1), the scheduler updates the control block for this virtual machine to indicate "idle" (step 212). Next, the virtual machine goes into a waiting/sleeping or "quiescent" state in which the virtual machine does not perform any work items although it is enabled to receive interrupts (step 214). Some time later, assume that the virtual machine receives an interrupt to alert the virtual machine that it has a task to do (decision 216). In response, the virtual machine will invoke the scheduler to check its work queue (step 200).

In the foregoing embodiment of the present invention illustrated in FIGS. 1-3, the WQAF of each virtual machine can assign a work item of its own virtual machine to any of the work queues 52, 54 or 56. In the foregoing embodiment of the present invention, the scheduler for each virtual machine removes work items only from its own work queue.

However, in another embodiment of the present invention, the scheduler can be given the freedom to remove a work item from any of the work queues 52, 54 or 56 based on its own dispatch algorithm. For example, if the semi-dedicated work queue (for example, work queue 54 for scheduler 44 in virtual machine 14) is empty, the scheduler (in this example, scheduler 44) may choose to remove a work item from another work queue (in this example, work queue 52 or 56) to fully utilize the processing power of its virtual machine, i.e. so its virtual machine does not sit idle. Alternately, if the semi-dedicated work queue of a scheduler is empty, the scheduler can attempt to remove a work item from the shared work queue described below.

Figure 4:
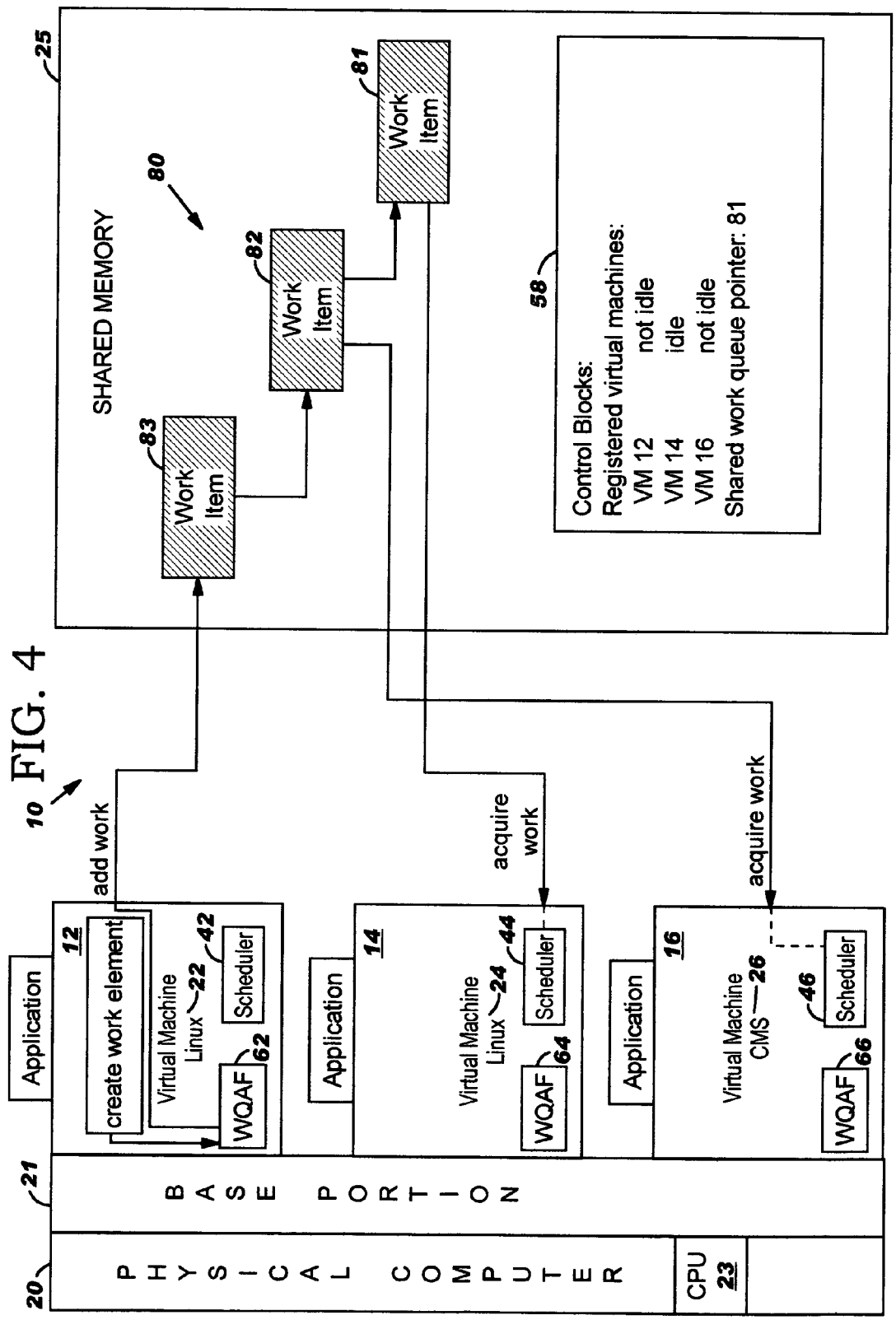
FIG. 4 is a block diagram of an additional, shared work queue feature of the computer system of FIG. 1.

FIG. 4 illustrates another feature of computer system 10 according to the present invention. A shared work queue 80 is stored in shared memory 25 instead of or in addition to semi-dedicated work queues 52, 54 and 56. The control block 58 includes a list of the virtual machines that are authorized/registered to add work items to and remove work items from the shared work queue. This authorization can be enforced by the Base Portion 21 based on a variety of criteria. For example, the authorization can be based on requests made by each virtual machine to share a work queue with other virtual machines. If all the virtual machines agree, then they are all authorized to share a work queue. Alternately, if any virtual machine requests to join an existing shared work queue it will be authorized if it has access to the shared memory. In any case, all the virtual machines that wish to share the shared work queue need direct access to the shared work queue. In the illustrated example, virtual machines 12, 14 and 16 are all authorized to access the shared work queue and this authorization is registered in the control block. Thus, each WQAF 62, 64 and 66 can add a work item to the shared work queue 80 and each scheduler 42, 44 and 46 is authorized to remove a work item from the shared work queue. If work queues 52, 54 and 56 are also present, then each WQAF has a choice, depending on its own assignment algorithm, whether to assign a work item originating from its own virtual machine to any of the work queues 52, 54, 56 or 80. Each WQAF also determines where in the shared work queue to insert its new work item based on its assignment algorithm, such as first in first out or based on priority level of the work item. Likewise, each scheduler has a choice depending on its dispatch algorithm, whether to remove a work item from its own work queue or the shared work queue. There is also an indication next to each authorized/registered virtual machine as to its status, "idle" or "not idle". The control block 58 also includes a pointer for the shared work queue 80 to indicate which work element is next to be removed by a scheduler from any of the authorized/registered virtual machines. Work elements are removed from shared work queue 80 in the order they are queued.

Figure 5:
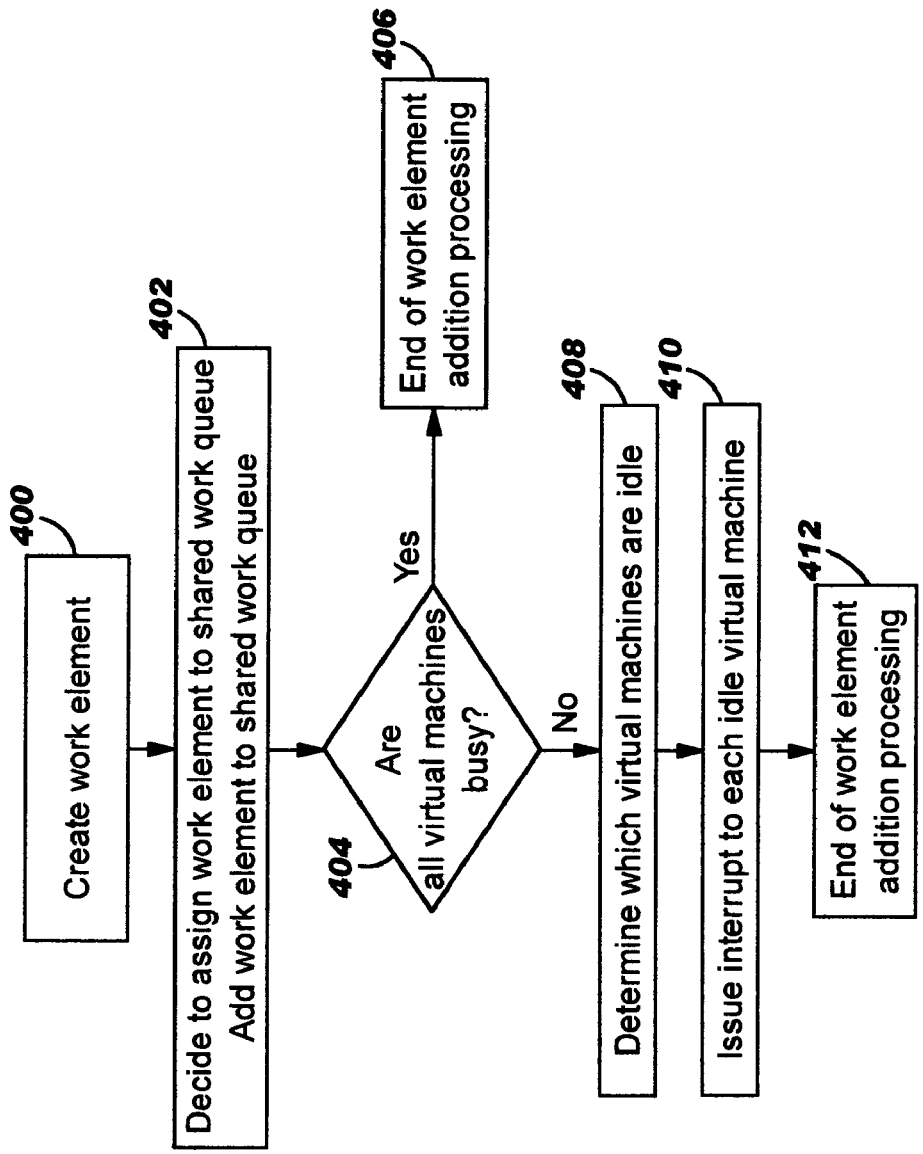
FIG. 5 is a flow chart illustrating a work queue assignment function and associated operation of virtual machines for the shared work queue of FIG. 4.

FIG. 5 illustrates the WQAF of each virtual machine and the associated operation of the virtual machine with respect to the shared work queue. The virtual machine creates a work item, such as to read or write data, execute an application, make a request to an application, etc. (step 400). This can be initiated by the guest operating system or by the application running on the guest operating system and passed to the guest operating system for handling. Next, the WQAF (for example, WQAF 62) within the virtual machine (in this example, virtual machine 12) that created the work item assigns the work item to a work queue determined by the assignment algorithm within the WQAF (step 402). In the example illustrated in FIG. 5, WQAF 62 assigns the work item to shared work queue 80, probably for load balancing purposes (step 402). Next, the WQAF 62 checks the control block to determine if all the virtual machines are "not idle", i.e. busy (decision 404). If so, then this ends the processing of WQAF 62 for this work element (step 406). As explained above, it would be wasteful/disruptive to interrupt any of the virtual machines under these conditions. However, if one or more of the virtual machines are "idle", then WQAF 62 identifies them from the control block (step 408) and then sends interrupts to all the "idle" virtual machines (step 410). This ends processing of this work item by WQAF 62 (step 412). The interrupt will alert the idle virtual machine(s) to invoke their scheduler(s) to check the shared work queue 80 for a work item.

Figure 6:
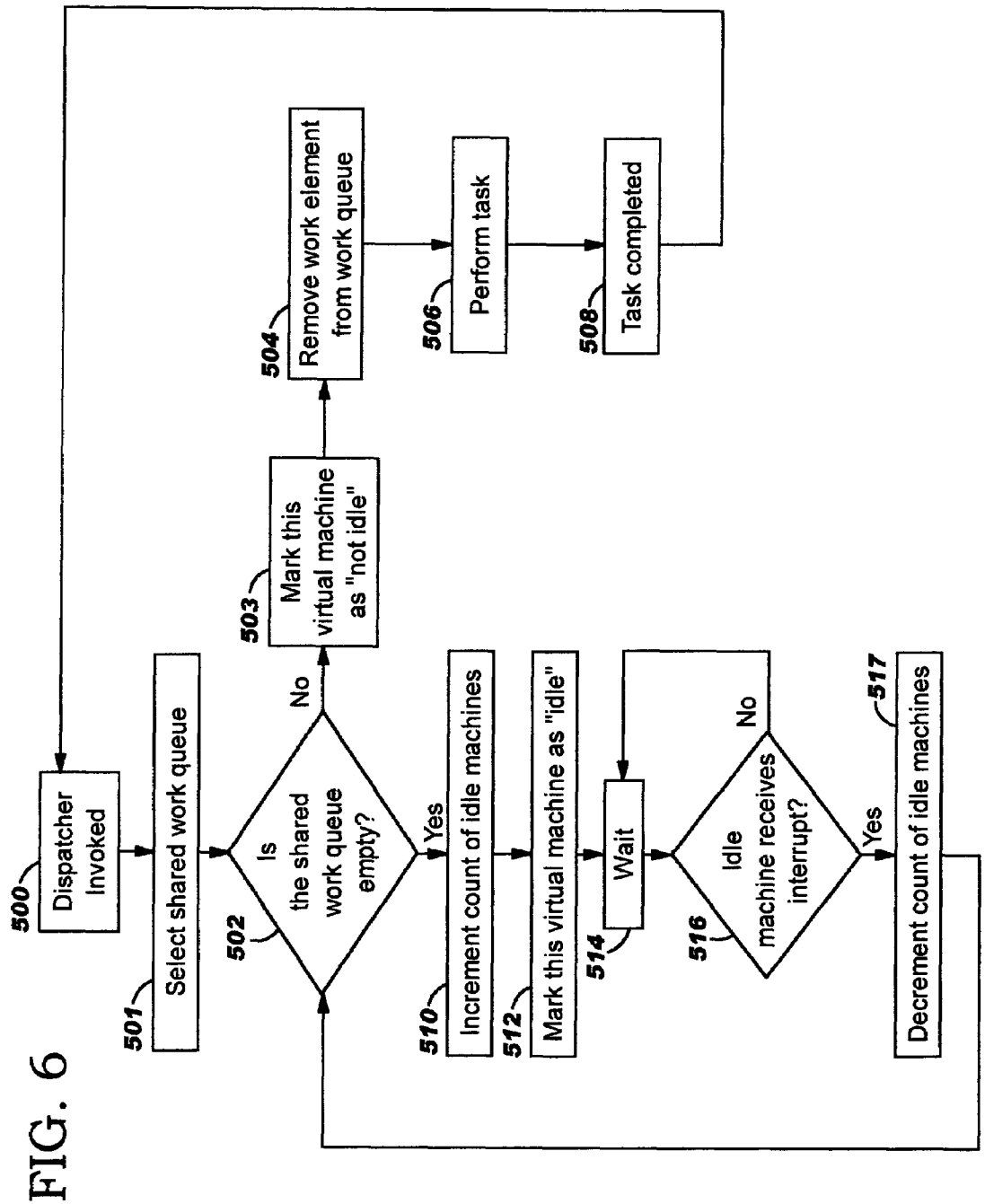
FIG. 6 is a flow chart illustrating a work dispatch function and associated operation of the virtual machines for the shared work queue of FIG. 4.

FIG. 6 illustrates the work scheduler of each virtual machine and the associated operation of the virtual machine in relation to the shared work queue. In step 500, the scheduler (for example, scheduler 42) of the virtual machine (in this example, virtual machine 12) is invoked. The invocation is initiated by the virtual processor within the virtual machine after a current work is completed or after receipt of an interrupt when the virtual machine is in the quiescent state. In response to its invocation, determines whether to fetch a work item from its semi-dedicated work queue or the shared work queue. This decision is based on an algorithm within the scheduler, or there may not be a work item on the semi-dedicated work queue to dispatch. For purposes of illustration, assume the scheduler decides to fetch a work item from the shared work queue (step 501). Next, the scheduler 42 checks the control block 58 to determine if there is a work item or a group of work items on shared work queue 80 (decision 502). As noted above, an interrupt will be sent to all the "idle" virtual machines to invoke their schedulers, and all the schedulers will attempt to fetch a work item from either their semi-dedicated work queue or the shared work queue. However, the first scheduler to access shared memory removes the first work item (step 504) so the other schedulers do not find this work item. If there is another work item available, then one of the other schedulers can remove it. Then, the virtual machine that just received the work item is marked "not idle" (step 503) and the scheduler 42 parses the work item to determine its nature and what function to call within virtual machine 12 to perform the work item (step 506). After the work item has been completed (step 508), the function which performed the work item calls the scheduler at step 500.

Referring again to decision 502, if there is no work item on the shared work queue, the scheduler updates the control block for its virtual machine to increment the "count" of idle virtual machines and indicate "idle" for its virtual machine (step 512). (The "count" was incremented because this virtual machine will soon become idle.) Next, the virtual machine goes into a waiting/sleeping or "quiescent" state (step 514). Some time later, assume that the virtual machine receives an interrupt to alert the virtual machine that there is a work item on its semi-dedicated work queue or the shared work queue (decision 516). In response, the virtual machine's WQAF decrements the count of idle virtual machines (step 517). Then, the virtual machine will invoke its scheduler again at step 500 to perform steps 501, 502, 504, 506 and 508.

Figure 7:
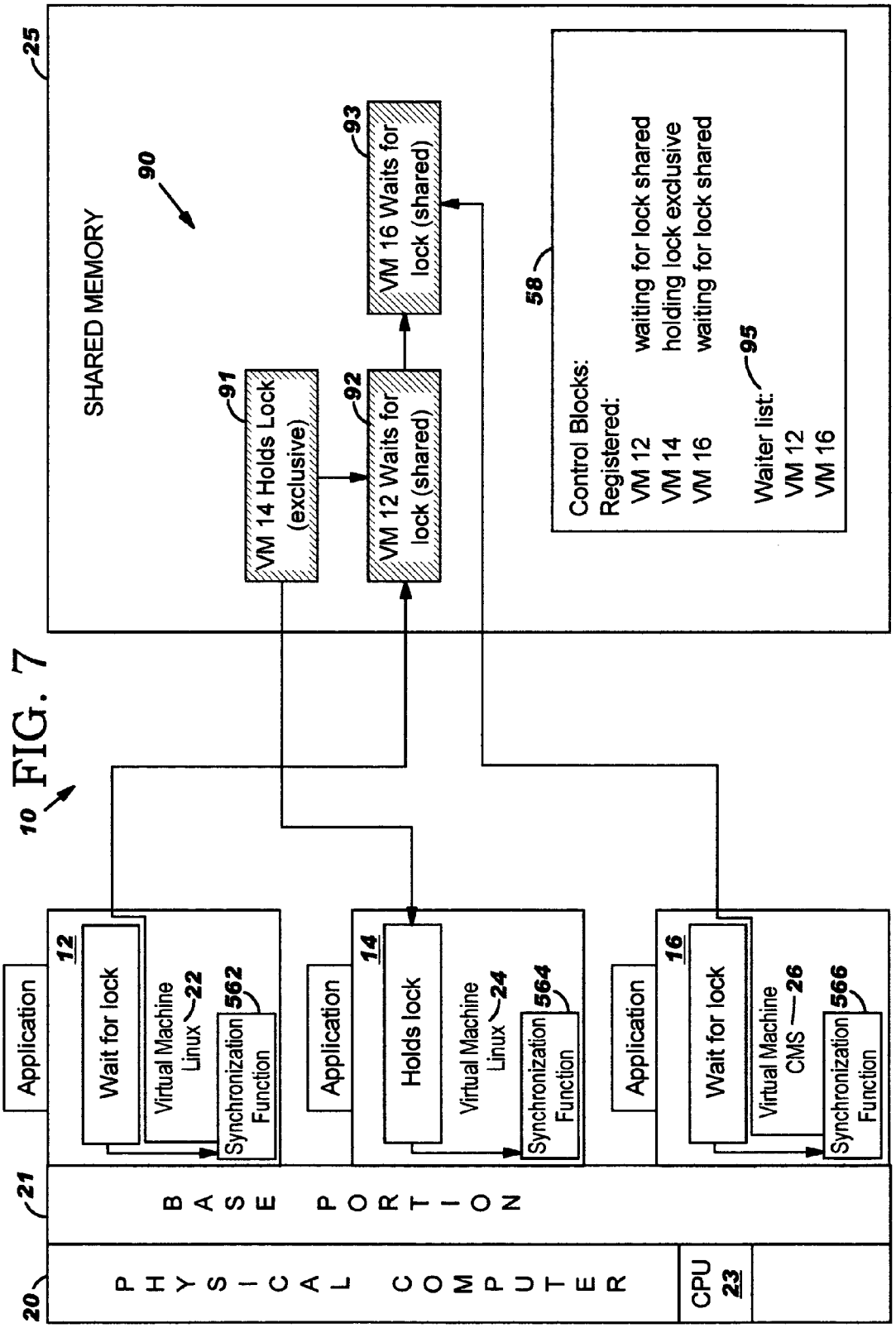
FIG. 7 is a block diagram of a synchronization function that allows multiple virtual machines to be collectively synchronized.

FIG. 7 figuratively illustrates a synchronization data structure generally designated 90 within the shared memory 25 of computer system 10. In the illustrated example, virtual machine 14 holds lock 91, virtual machine 12 has a place holder 92 waiting for the lock from virtual machine 14, and virtual machine 16 has a place holder 93 waiting for the lock from virtual machine 12. This is actually recorded in control block 58 which indicates that virtual machine 14 holds the lock and virtual machines 12 and 16 are currently waiting for the lock. The "waiter list" 95 of control block 58 indicates the order of the waiters, i.e. virtual machine 12 is first in line for the lock and virtual machine 16 will attempt to obtain the lock after virtual machine 12 obtains the lock. In the example, virtual machine 14 holds lock 91 exclusively, that is, no other virtual machine may concurrently hold this lock. Virtual machine 12 and 16 are waiting for the lock and willing to hold the lock shared, that is, they may concurrently hold the lock with each other.

Figure 8:
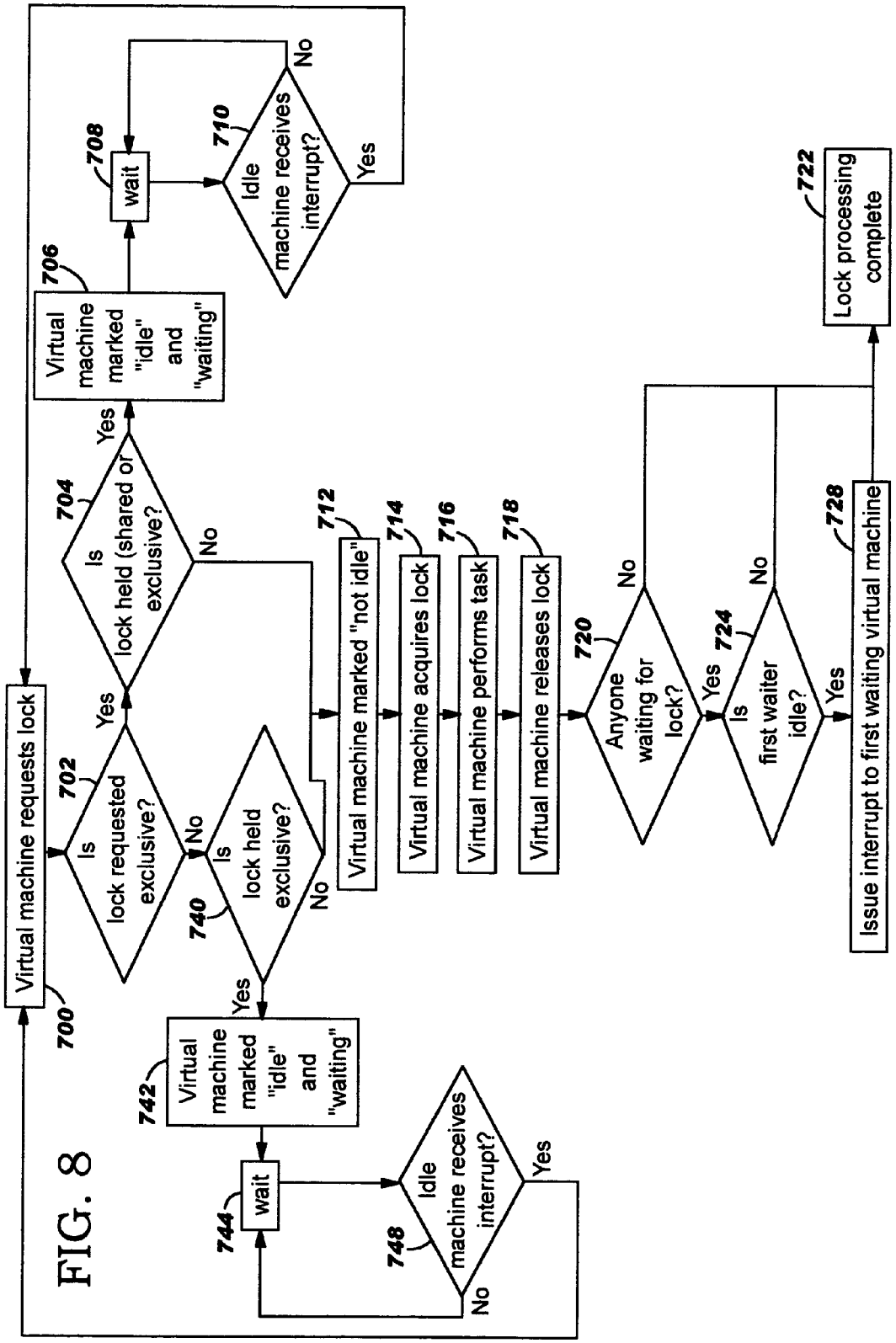
FIG. 8 is a flow chart illustrating a synchronization function and associated operation of the virtual machines for the synchronization function of FIG. 7.

FIG. 8 illustrates a synchronization function and associated operation of each of the virtual machines that is trying to obtain the lock for the shared work queue 80 in shared memory. In the following example, a virtual machine (such as virtual machine 14) requests a lock for the shared work queue 80 (step 700). If the virtual machine just wants to read the shared work queue, then the virtual machine need only request a shared lock. However, if the virtual machine wants to remove a work item from the shared work queue (which is more typically the case), then the virtual machine will request an exclusive lock. Typically, the virtual machine will want to remove a work item from the work queue, so will request an exclusive lock for this objective and decision 702 leads to decision 704. In decision 704, the synchronization function determines if the requested lock is currently held by another virtual machine (either in a shared or exclusive manner). If so, the exclusive lock is not available to the current requester, and synchronization function updates the control block to indicate that the requesting virtual machine is idle and "waiting" for the exclusive lock (step 706). Also, the virtual machine enters a waiting/quiescent state (step 708) where it waits for an interrupt (decision 710). Referring again to decision 704, if the requested lock is not currently held by anyone, then the synchronization function marks the virtual machine as "not idle" (step 712) and grants the lock to the virtual machine (step 714). This granting of the lock is accomplished by corresponding update to control block 58. Next, the virtual machine removes the next work item from the shared work queue 80 and performs the task indicated by the work item (step 716). Afterwards, the virtual machine notifies the synchronization function that it has performed the work item, and it is "releasing" the lock (step 718). In response, the synchronization function updates the control block 58 to indicate that the lock has been released. Also, the synchronization function determines from the control block 58 if any other virtual machine is currently waiting for the lock (decision 720). If not, the processing of the synchronization function is complete (step 722). If so, the synchronization function determines from the control block 58 if the first virtual machine marked "waiting" is "idle" (decision 724). If not, the processing of the synchronization function is complete (step 722) because it would be too disruptive of the non idle, waiting virtual machine to be interrupted at this time. Instead, when the non idle, waiting virtual machine completes its current work item or at some other time that is convenient for the waiting virtual machine, it will likely request the lock on its own at step 700. Referring again to decision 724, if the waiting virtual machine is idle, then the synchronization function issues an interrupt to the waiting virtual machine (step 728). This will not be wasteful to the waiting virtual machine because it is idle anyway. After receiving the interrupt, the idle virtual machine will awaken and can request the lock at step 700.

Referring back again to decision 702, if the lock requested by the virtual machine is shared and not exclusive, such as to read the shared work queue, then the synchronization function determines if the lock is currently being held in an exclusive manner (decision 740). If not (i.e. no lock is currently being held or only a shared lock is currently being held), then the synchronization function proceeds to step 712 and continues as described above. However, if the lock is currently being held in an exclusive manner, then the synchronization function marks in the control block 58 that the requesting virtual machine as "idle" and "waiting" for a shared lock (step 742). Then, the requesting virtual machine enters into a waiting/quiescent state (step 744), waiting for an interrupt (decision 748). Upon receipt of such an interrupt, it can proceed to step 700 to request the lock.

Based on the foregoing, a computer system embodying the present invention has been disclosed. However, numerous modifications and substitutions can be made without deviating from the scope of the present invention. For example, logical partitions could be substituted for the virtual machines. Therefore, the present invention has been disclosed by way of illustration and not limitation, and reference should be made to the following claims to determine the scope of the present invention.

The invention claimed is:

1. A computer system comprising:
a processor;
a memory;
a first work queue in said memory;
a second work queue in said memory;
a first virtual machine sharing said processor and including a first program function to directly access said first work queue to assign a first work item to said first work queue and directly access said second work queue to assign a second work item to said second work queue, said first and second work items originating from said first virtual machine;
a second virtual machine sharing said processor and including a second program function to directly access said first work queue to assign a third work item to said first work queue and directly access said second work queue to assign a fourth work item to said second work queue, said third and fourth work items originating from said second virtual machine;
said first virtual machine also including a third program function to directly access said memory to identify said first and third work items on said first work queue without receiving an interrupt, said first and third work items being assigned to said first work queue while said first virtual machine was not idle, said third program function scheduling said first and third work items from said first work queue for execution by said first virtual machine; and
said second virtual machine also including a fourth program function to directly access said memory to identify said second and fourth work items from said second work queue without receiving an interrupt, said second and fourth work items being assigned to said second work queue while said second virtual machine was not idle, said fourth program function scheduling said second and fourth work items from said second work queue for execution by said second virtual machine; and wherein
said memory is shared by said first and second virtual machines.

2. A computer system as set forth in claim 1 wherein said third program function is not able to schedule work items from said second work queue, and said fourth program function is not able to schedule work items from said first work queue.

3. A computer system as set forth in claim 1 wherein said first and third program functions are private to said first virtual machine such that said second virtual machine cannot access said first and third program functions, and said second and fourth program functions are private to said second virtual machine such that said first virtual machine cannot access said second and fourth program functions.

4. A computer system as set forth in claim 1 wherein:
said first program function is part of an operating system in said first virtual machine; and
another program function within said operating system originated said first work item and passed it to said first program function.

5. A computer system a set forth in claim 1 wherein said first program function is stored in a computer readable media, said second program function is stored in a computer readable media, said third program function is stored in a computer readable media and said fourth program function is stored in a computer readable media.

6. A computer system as set forth in claim 5 wherein a program within said first virtual machine executes the work items scheduled for execution by said third program function, and a program within said second virtual machine executes the work items scheduled for execution by said fourth program function.

7. A computer system as set forth in claim 1 wherein said first work item is a request to read or write data.

8. A computer system as set forth in claim 1 further comprising:
a control block in said memory that is shared by said first and second virtual machines, said control block indicating said first and third work items on said first work queue, said control block indicating respective addresses of said first and third work items on said first work queue, said control block indicating said second and fourth work items on said second work queue, said control block indicating respective addresses of said second and fourth work items on said second work queue; and wherein
said third program function directly accesses said control block to identify said first and third work items on said first work queue without receiving an interrupt; and
said fourth program function directly accesses said control block to identify said second and fourth work items on said second work queue without receiving an interrupt.

9. A method for managing work items in a computer system, said computer system comprising first and second virtual machines, said method comprising the steps of:
creating a first work queue in a memory;
creating a second work queue in said memory;
said first virtual machine including a first program function which directly accesses said said first work queue to assign a first work item to said first work queue and directly accesses said second work queue to assign a second work item to said second work queue, said first and second work items originating from said first virtual machine;
said second virtual machine including a second program function which directly accesses said first work queue to assign a third work item to said first work queue and directly accesses said second work queue to assign a fourth work item to said second work queue, said third and fourth work items originating from said second virtual machine;
said first virtual machine also including a third program function which directly accesses said memory to identify said first and third work items on said first work queue without receiving an interrupt, said first and third work items being assigned to said first work queue while said first virtual machine was not idle, said third program function scheduling said first and third work items from said first work queue for execution by said first virtual machine; and
said second virtual machine also including a fourth program function which directly accesses said memory to identify said second and fourth work items from said second work queue without receiving an interrupt, said second and fourth work items being assigned to said second work queue while said second virtual machine was not idle, said fourth program function scheduling said second and fourth work items from said second work queue for execution by said second virtual machine.

10. A method as set forth in claim 9 wherein said first virtual machine is not able to schedule any work items from said second work queue, and said second virtual machine is not able to schedule any work items from said first work queue.

11. A method as set forth in claim 9 wherein:
said first program function and said third program function in said first virtual machine are private to said first virtual machine, and said second virtual machine cannot access said first program function or said third program function; and
said second program function and said fourth program function in said second virtual machine are private to said second virtual machine, and said first virtual machine cannot access said second program function or said fourth program function.

12. A method as set forth in claim 9 farther comprising the step of:
maintaining a control block in said memory which is shared by said first and second virtual machines, said control block indicating said first and third work items on said first work queue, said control block indicating respective addresses of said first and third work items on said first work queue, said control block indicating second and fourth work items on said second work queue, said control block indicating respective addresses of said second and fourth work items on said second work queue; and wherein
said third program function directly accesses said control block to identify said first and third work items on said first work queue without receiving an interrupt; and
said fourth program function directly accesses said control block to identify said second and fourth work items on said second work queue without receiving an interrupt.

13. A computer program product for managing work items in a computer system, said computer system defining first and second virtual machines, said computer program product comprising:
a computer readable medium;
first program instructions for execution in said first virtual machine to directly access a first work queue to assign a first work item to said first work queue in a memory and directly access a second work queue to assign a second work item to said second work queue in said memory, said first and second work items originating from said first virtual machine;

second program instructions for execution in said second virtual machine to directly access said first work queue to assign a third work item to said first work queue and directly access said second work queue to assign a fourth work item to said second work queue, said third and fourth work items originating from said second virtual machine;

third program instructions for execution in said first virtual machine to directly access said memory to identify said first and third work items on said first work queue without receiving an interrupt, said first and third work items being assigned to said first work queue while said first virtual machine was not idle, said third program instructions scheduling said first and third work items from said first work queue for execution by said first virtual machine; and fourth program instructions for execution in said second virtual machine to directly access said memory to identify said second and fourth work items on said second work queue without receiving an interrupt, said second and fourth work items being assigned to said second work queue while said second virtual machine was not idle, said fourth program instructions scheduling said second and fourth work items from said second work queue for execution by said second virtual machine; and wherein said first, second, third and fourth program instructions are recorded on said medium.

14. A computer program product as set forth in claim 13 wherein said first virtual machine is not able to schedule any work items from said second work queue, and said second virtual machine is not able to schedule any work items from said first work queue.

15. A computer program product as set forth in claim 13 further comprising:

fifth program instructions to maintain a control block in said memory which is shared by said first and second virtual machines, said control block indicating said first and third work items on said first work queue, said control block indicating respective addresses of said first and third work items on said first work queue, said control block indicating second and fourth work items on said second work queue, said control block indicating respective addresses of said first and fourth work items on said second work queue; and wherein said third program instructions directly access said control block to identify said first and third work items on said first work queue without receiving an interrupt;

said fourth program instructions directly access said control block to identify said second and fourth work items on said second work queue without receiving an interrupt; and wherein said fifth program instructions are recorded on said medium.

16. A computer system including a processor and a memory and comprising first and second virtual machines, said computer system comprising:

a work queue in said memory; and wherein said first virtual machine shares said processor and includes a first program function to directly access said work queue and assign a first work item originating from said first virtual machine to said work queue;

said second virtual machine shares said processor and includes a second program function to direct access said work queue and assign a second work item originating from said second virtual machine to said work queue;

said first virtual machine includes a third program function to directly access said memory to identify said second work item on said work queue without receiving an interrupt, said second work item being assigned to said work queue while said first virtual machine was not idle, said third program function schedules said second work item, originating from said second virtual machines, from said work queue for execution by said first virtual machine;

said second virtual machine includes a fourth program function to directly access said memory to identify said first work item on said work queue without receiving an interrupt for said first work item, said first work item being assigned to said work queue while said second virtual machine was not idle, said fourth program function schedules said first work item, originating from said first virtual machine, from said work queue for execution by said second virtual machine;

said first program function is stored on a computer readable media, said second program function is stored on a computer readable media, said third program function is stored on a computer readable media and said fourth program function is stored on a computer readable media; and said memory is shared by said first and second virtual machines.

17. A computer system as set forth in claim 16 wherein:

said first and second program functions are private to said first virtual machine such that said second virtual machine cannot access said first and second program functions; and said third and fourth program functions are private to said second virtual machine such that said first virtual machine cannot access said second and third program functions.

18. A computer system as set forth in claim 16 further comprising:

a control block in said memory which is shared by said first and second virtual machines, said control block indicating said first and third work items on said first work queue, said control block indicating respective addresses of said first and third work items on said first work queue, said control block indicating second and fourth work items on said second work queue, said control block indicating respective addresses of said second and fourth work items on said second work queue; and wherein said second program function directly accesses said control block to identify said first and third work items on said first work queue without receiving an interrupt; and said fourth program function directly accesses said control block to identify said second and fourth work items on said second work queue without receiving an interrupt.

* * * * *